United States Patent
Thiery et al.

(10) Patent No.: US 12,217,364 B2
(45) Date of Patent: Feb. 4, 2025

(54) 3D MODELING USER INTERFACES BY INTRODUCING IMPROVED COORDINATES FOR TRIQUAD CAGES

(71) Applicant: Adobe Inc., San Jose, CA (US)

(72) Inventors: Jean Thiery, Paris (FR); Tamy Boubekeur, Paris (FR)

(73) Assignee: Adobe Inc., San Jose, CA (US)

( * ) Notice: Subject to any disclaimer, the term of this patent is extended or adjusted under 35 U.S.C. 154(b) by 75 days.

(21) Appl. No.: 17/947,035

(22) Filed: Sep. 16, 2022

(65) Prior Publication Data

US 2024/0104846 A1 Mar. 28, 2024

(51) Int. Cl.
*G06T 17/20* (2006.01)
*G06T 17/10* (2006.01)

(52) U.S. Cl.
CPC ............ *G06T 17/205* (2013.01); *G06T 17/10* (2013.01)

(58) Field of Classification Search
None
See application file for complete search history.

(56) References Cited

U.S. PATENT DOCUMENTS

| | | | |
|---|---|---|---|
| 4,821,214 A | 4/1989 | Sederberg | |
| 2010/0321386 A1 | 12/2010 | Lin et al. | |
| 2019/0228577 A1* | 7/2019 | Gregory | G06T 17/20 |
| 2021/0366189 A1* | 11/2021 | Borduas | G06T 19/20 |

OTHER PUBLICATIONS

Borosan et al., Hybrid Mesh Editing, Eurographics, Available online at: https://diglib.eg.org/bitstream/handle/10.2312/egsh.20101043. 041-044/041-044.pdf?sequence=1&isAllowed=y, 2010, pp. 41-44.
Chen et al., Variational Harmonic Maps for Space Deformation, ACM Transactions on Graphics, vol. 28, No. 3, Jul. 27, 2009, 11 pages.
Floater, Generalized Barycentric Coordinates and Applications, Acta Numerica, vol. 24, May 1, 2015, pp. 161-254.
Floater, Mean Value Coordinates, Computer Aided Geometric Design, vol. 20, No. 1, Mar. 2003, pp. 1-9.

(Continued)

*Primary Examiner* — Yingchun He
(74) *Attorney, Agent, or Firm* — Kilpatrick Townsend & Stockton LLP

(57) ABSTRACT

A modeling system displays a three-dimensional (3D) space including a 3D object including a plurality of points and a cage model of the 3D object including a first configuration of vertices and quad faces. Each of the plurality of points is located at a respective initial location. The modeling system generates cage coordinates for the cage model including a vertex coordinate for each vertex of the cage model and four quad coordinates for each quad face of the cage model corresponding to each corner vertex of the quad. The modeling system deforms, responsive to receiving a request, the cage model to change the first configuration of vertices to a second configuration. The modeling system generates, based on the cage coordinates, the first configuration of vertices, and the second configuration of vertices, an updated 3D object by determining a subsequent location for each of the plurality of points.

21 Claims, 6 Drawing Sheets

(56) References Cited

OTHER PUBLICATIONS

Guennebaud et al., Eigen, vol. 3, Available online at: http://eigen.tuxfamily.org, Jan. 2010, Abstract available at https://eigen.tuxfamily.org/index.php?title=Main_Page, pp. 1-13, accessed Sep. 27, 2023.

Hormann et al., Generalized Barycentric Coordinates in Computer Graphics and Computational Mechanics, CRC Press, Oct. 23, 2017, 55 pages.

Huang et al., Subspace Gradient Domain Mesh Deformation, Available online at: https://people.engr.tamu.edu/schaefer/teaching/689_Fall2006/subspace.pdf, Jul. 1, 2006, 9 pages.

Jacobson et al., Skinning: Realtime Shape Deformation, ACM SIGGRAPH 2014 Courses, 2014, 1 page.

Joshi et al., Harmonic Coordinates for Character Articulation, ACM Transactions on Graphics, vol. 26, No. 3, Jul. 29, 2007, 10 pages.

Ju et al., Mean Value Coordinates for Closed Triangular Meshes, Available online at: https://graphics.stanford.edu/courses/cs468-05-fall/Papers/p561-ju.pdf, Jul. 1, 2005, pp. 561-566.

Langer et al., Spherical Barycentric Coordinates, Eurographics Symposium on Geometry Processing, Jun. 26, 2006, 9 pages.

Lipman et al., GPU-Assisted Positive Mean Value Coordinates for Mesh Deformations, Eurographics Symposium on Geometry Processing, Jul. 4, 2007, 7 pages.

Lipman et al., Green Coordinates, ACM Transactions on Graphics, vol. 27, No. 3, Article 78, Aug. 1, 2008, 10 pages.

Thiery et al., Jacobians and Hessians of Mean Value Coordinates for Closed Triangular Meshes, The Visual Computer, vol. 30, No. 9, 2014, 15 pages.

Thiery et al., Mean Value Coordinates for Quad Cages in 3D, ACM Transactions on Graphics, vol. 37, No. 6, Dec. 4, 2018, pp. 1-14.

GB Application No. GB 2310466.4 combined Search and Examination report dated Jan. 31, 2024, 6 pages.

\* cited by examiner

200

210 ACCESSING A THREE-DIMENSIONAL (3D) OBJECT INCLUDING A PLURALITY OF POINTS AND A CAGE MODEL ASSOCIATED WITH THE 3D OBJECT INCLUDING A FIRST CONFIGURATION OF VERTICES

220 GENERATING, CAGE COORDINATES FOR THE CAGE MODEL

221 DETERMINING VERTICES ASSOCIATED WITH QUADS AND TRIANGLES OF THE CAGE MODEL

223 FOR EACH QUAD OF THE CAGE MODEL, DETERMINING NORMALS FOR CORNER VERTICES OF THE QUAD

225 FOR EACH TRIANGLE OF THE CAGE MODEL, DETERMINING A NON-VARYING NORMAL FOR THE TRIANGLE

227 DETERMINING CAGE COORDINATES FOR THE CAGE

230 DEFORMING, RESPONSIVE TO RECEIVING AN INPUT, THE CAGE MODEL BY CHANGING THE FIRST CONFIGURATION OF VERTICES TO A SECOND CONFIGURATION DIFFERENT FROM THE FIRST CONFIGURATION

240 UPDATING LOCATIONS OF POINTS OF THE 3D OBJECT BASED ON THE DEFORMED CAGE MODEL OF 230 AND THE CAGE COORDINATES GENERATED IN 220

*FIG. 2*

3D MODELING USER INTERFACES BY INTRODUCING IMPROVED COORDINATES FOR TRIQUAD CAGES

TECHNICAL FIELD

This disclosure generally relates to techniques for three-dimensional (3D) scene modeling. More specifically, but not by way of limitation, this disclosure relates to generating improved coordinates for triquad cages to improve 3D shape deformation.

BACKGROUND

Conventional 3D modeling systems use polygon mesh models to represent objects and enable high resolution freeform deformation using a second mesh, called the cage model, that typically encompass the 3D object and is made of fewer polygons. Users can deform the cage model by moving one or more vertices of the cage model, and the resulting deformation is transferred the main model by the means of cage coordinates

SUMMARY

The present disclosure describes techniques for generating cage coordinates for a cage model of a 3D object and performing a deformation operation of the 3D object thanks to the cage model. A modeling system displays, via a user interface, a three-dimensional (3D) space including a 3D object including a plurality of points and a cage model associated with the 3D object including a first configuration of vertices. The cage model includes triangle and quad faces. Each of the plurality of points is located at a respective initial location. The modeling system generates cage coordinates for the 3D object model, one set for each point of the 3D object. The cage coordinates, for each point of the 3D object, include a vertex coordinate for each vertex of the cage model and four quad coordinates for each quad face of the cage model corresponding to each corner vertex of the quad. The modeling system deforms, responsive to receiving a request via the user interface, the cage model to change the first configuration of vertices to a second configuration. The modeling system generates, based on the cage coordinates, the first configuration of vertices, and the second configuration of vertices, an updated the 3D object by determining a subsequent location for each of the plurality of points of the 3D object Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts a method for generating cage coordinates for a cage model of a 3D object and performing a deformation operation of the 3D object using its associated cage model, according to certain embodiments disclosed herein.

DETAILED DESCRIPTION

Figure 1:
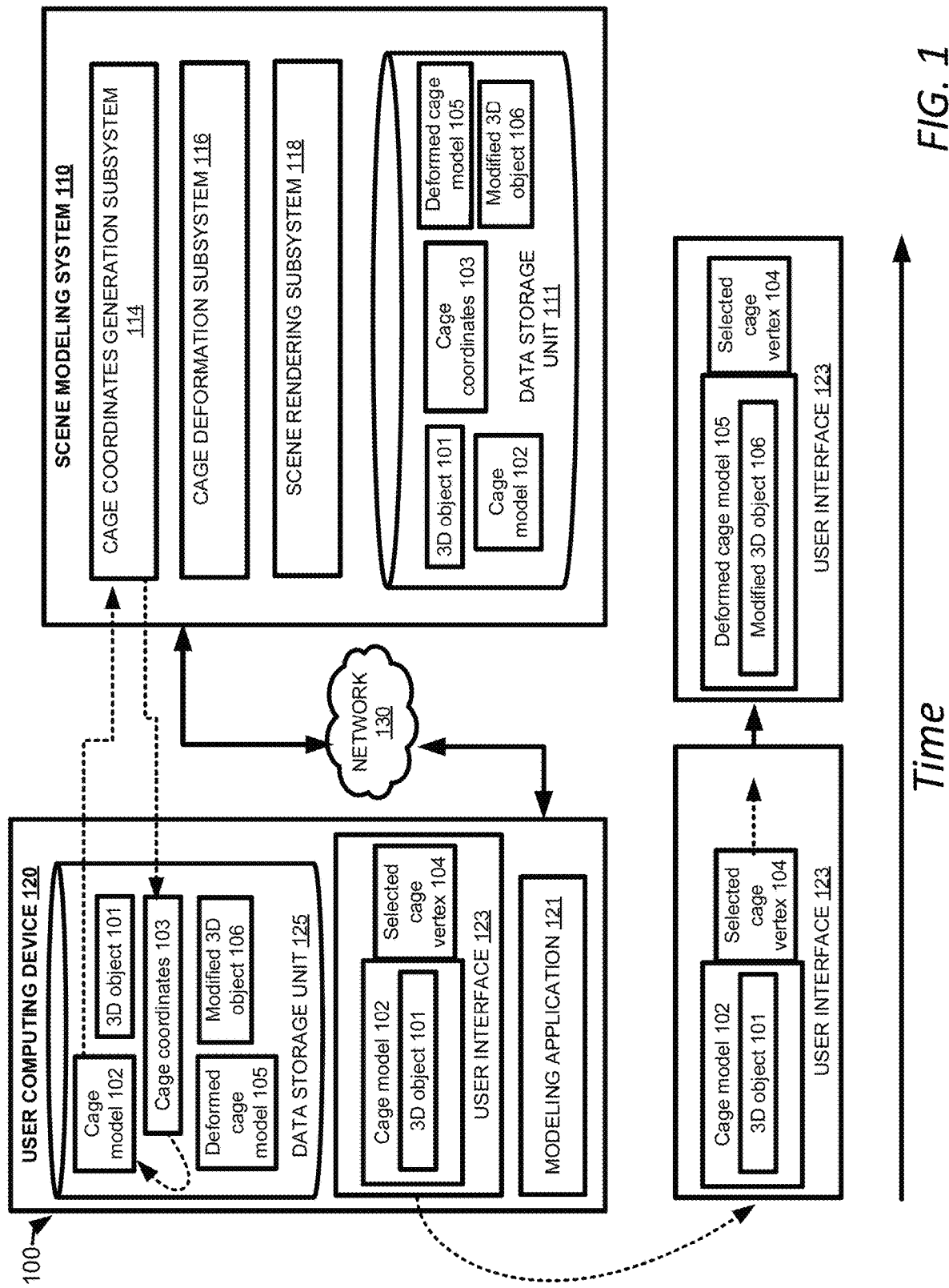
FIG. 1 depicts an example of a computing environment for generating cage coordinates for a cage model of a 3D object and performing a deformation operation of the 3D object using its associated cage model, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Conventional modeling systems utilize cage models defining cage coordinates, where cage models express space as a linear combination of the elements of a cage, to encode a geometry of a high resolution shape and to enable its freeform deformation through movement of vertices of the cage model. Conventionally, for realistic modeling, quad cages or triquad cages are preferred to triangulated cages because quad/triquad cages enable more accurate deformations than triangulated cages. However, quad and triquad cages are more complex to represent because the four vertices (e.g. corners) of a quad (a quad face) of the cage are unlikely be aligned in a 2D plane, whereas the three vertices of a triangle (a triangle face) always form a 2D plane. Conventional modeling systems use generalized barycentric coordinate systems such as mean value coordinates ("MVC") to represent triangulated cages and, in some instances, quad mean value coordinates ("QMVC") to represent quad cages. However usage of QMVC and MVC does not produce quasi-conformal 3D deformations, i.e. these conventional methods do not locally preserve volumes. Further, with respect to triangulated cages, conventional modeling systems may employ Green coordinates, which express a 3D point as a harmonic linear combination of cage vertices and cage triangle normals. However, conventional Green coordinates, which include a single normal vector representing a triangular face orientation, are not accurate for use in quad and triquad cages, which, as described previously, are likely to have quads that are non-planar and thus the single normal value of conventional Green coordinates does not accurately represent the geometric configuration of a typical quad in instances where a substantial number or percentage of quads of the quad/triquad cage model are non-planar. Further, applying conventional Green coordinates to quad cages by dividing quads into triangles results in asymmetric artifacts in the deformed cage model.

Certain embodiments described herein address the limitations of conventional cage-based modeling systems by providing improved coordinates for use in quad cages or triquad cages. The improved cage coordinates described herein take into account normal values for corner vertices of quads and therefore increase an accuracy of modeling of quads in quad cages and triquad cages, enabling more accurate deformation of cages over conventional systems which are not able to effectively model the non-planarity of quads. Using the improved cage coordinates described herein, deformation in a quad cage model or triquad cage model can locally contain both translation and rotation, which results in an improved preservation of volume over conventional cage-based modeling systems and also results a reduction of asymmetric artifacts which occur in deformations using conventional cage-based modeling systems.

The following non-limiting example is provided to introduce certain embodiments. In this example, a scene modeling system accesses a three-dimensional (3D) virtual space including a 3D object. The 3D object may be of a car, a human face, a building, clothing, or other object. The 3D virtual space may represent an environment such as a room or an outdoor space. For example, the scene modeling system accesses a 3D virtual space including a 3D car object displayed within the 3D virtual space. The 3D object may include defined dimensions, contours, or other information which defines a volume occupied by the 3D object within the 3D virtual space. In some instances, the scene modeling system accesses the 3D virtual space including the 3D object responsive to receiving a user input. For example, a modeling application executing on a user computing device (e.g. a mobile device) of a user is associated with and communicates with the scene modeling system (e.g. via a network). In this example, the user accesses the modeling application, selects one or more objects on a user interface of the user computing device to request to access the 3D object or generate a new 3D object, the scene modeling system accesses the 3D virtual scene including the 3D object responsive to receiving the user selection, and the scene modeling system provides the 3D virtual scene including the 3D object for display via the user interface of the user computing device.

The scene modeling system accesses a cage model that overlays the 3D object. Cage models comprise vertices which form a connected mesh of quadrangular (4-sided, quad) and/or triangular (3-sided, triangle) faces. In some instances, the cage model comprises a quad cage model or a triquad cage model. For example, quad cage models only include quads. Triquad cage models include a combination of quads and triangular faces. Corners of a face of the cage model are shared in common with adjacent face(s) of the cage model. Triangular faces are defined by three vertices (corners) within the 3D virtual space which lie in a common two-dimensional (2D) plane. Quad faces (quads) are defined by four vertices within the 3D virtual space, which may or may not lie in a common 2D plane. In many instances, most if not all of the quads of a quad cage model or of a triquad cage model are non-planar. In some instances, the boundaries of the cage model coincide or substantially coincide with boundaries of the 3D object within the 3D virtual space. In other instances, the cage model surrounds the boundaries of the 3D object and are offset by a predetermined amount beyond the boundaries of the 3D object within the 3D virtual space. In some instances, the scene modeling system displays the cage model overlaying the 3D object via the user interface of the user computing device.

In certain embodiments, the improved cage coordinates generated herein include, for any given 3D point, a vertex coordinate for each vertex of the cage model, triangle coordinates comprising a coordinate for each triangle of the cage model, and quad coordinates comprising four coordinates for each quad of the cage model. Each respective triangle coordinate of the cage coordinates can be determined based on a non-varying normal value determined for the respective triangle. Each of the four quad coordinates for each respective quad of the cage model can be determined based on the corner vertex normal values of the respective quad (which accounts for the non-planarity of the respective quad). A function can be used to determine, responsive to a deformation of the cage model, any point of the 3D object (where the 3D object is comprised of a plurality of points) using the improved cage coordinates generated herein. The function is a blending of several cage coordinates with blending weights that depend on a location. In certain embodiments, the cage coordinates can further include a stretch value that is optimized for the specific deformation of the cage model and is determined based on both the original configuration of vertices of the cage model as well as the configuration of the vertices of the deformed cage model.

A location of each point on the 3D object, which includes a plurality of points (e.g., thousands of points), using the improved coordinates described herein, is defined using a location function (e.g., a deformation function) in terms of the improved cage coordinates (e.g., the vertex coordinate for each vertex of the cage model, the triangle coordinate for each triangle of the cage model, and the four quad coordinates for each quad of the cage model). Once the cage coordinates are determined for the initial cage model, the location function (deformation function) can be used to determine new locations for points of the 3D object responsive to performing a deformation of the cage model, without having to update the cage coordinates. For example, the user can select one or more vertices on the cage model to perform deformation operations on the cage model.

For example, the scene modeling system receives a selection of the particular vertex on the cage model and performs a deformation operation on the cage model at the selected particular vertex by moving the vertex to a new position, which stretches the cage model. A deformation operation can include one or more of stretching, compressing, indenting, pulling, smoothing, rotating, or other manipulation of the cage model using the selected one or more vertices. Deforming the cage model may, for vertices of various faces (e.g. quads and triangles) of the cage model affected by the deformation operation, change a position of the vertex, a distance between the vertex and one or more neighboring vertices in the cage model, and/or a direction from the vertex to one or more neighboring vertices in the cage model. In certain embodiments, however, the scene modeling system can deform the cage model by moving one or more vertices of the cage model without having to receive a selection via the user interface these one or more vertices. The deformed cage model includes the same number of quads and/or triangles as the original cage model but one or more of the vertices is changed to a new position as a result of performing deformation operation(s).

Responsive to performing the deformation operation on the cage model to generate the deformed cage model, the scene modeling system updates the 3D object based on the updated cage model by calculating a position of each of the points of the 3D object. As a result of the new configuration of vertices in the deformed cage model, one or more points of the 3D object are translated to a new position in 3D space in accordance with the location function (deformation function) that defines the position in terms of the cage coordinates generated herein. For example, after the deformation operation is performed, all of the positions of points on the 3D object (which are defined within a virtual space that includes the 3D object using the location function) can be updated by multiplying the underlying cage coordinates with the deformed cage model.

In certain embodiments, the improved cage coordinates generated herein provide advantages over conventional coordinates for cage-based modeling. For example, generating the improved cage coordinates described herein include generating quad coordinates for each quad of the cage model that are determined based on corner vertex normals of the respective quad, instead of merely expressing a 3D point as a harmonic linear combination of vertices or triangulating the quad into two triangles and assigning a single non-varying normal for each of the two triangle faces resulting from the quad, as is done in conventional coordinates for triangular cage models (e.g. Green coordinates for triangular-faced cages). Accounting for a normal for each vertex of a quad enables the coordinates to better account for non-planarity of the quad over the conventional approaches, which increases an accuracy of deformations performed using the quad/triquad cage model, especially in cage model configurations where a substantial number or percentage of quads of the quad/triquad cage model are non-planar (which is the type of cage model configuration encountered in most use cases). When performing deformation operations on a cage model, usage of conventional non-Green-based (e.g. MVC, QMVC coordinates) result in loss of geometric details in highly-stretched regions. Usage of the improved cage coordinates described herein, in comparison to conventional QMVC coordinates defining barycentric weights for a 3D point with respect to the vertices of a quad cage, results in superior deformation modeling under non-trivial cage deformations (e.g. large stretch and shear operations and twisting operations) by deforming the 3D space in a quasi-conformal manner, thus avoiding the deterioration of these geometric structures in highly-stretched regions of the cage model.

Also, usage of the improved cage coordinates described herein provide for superior deformation modeling when compared to conventional Green coordinates for triangular cage models. However, triangular cage models employing conventional Green coordinates results in introduction of asymmetric artifacts by deformation. Usage of the improved coordinates described herein for quad/triquad cages avoids introducing these asymmetric artifacts and therefore improves an accuracy of deformation operations performed on a cage model.

Further, the improved cage coordinates herein, in some embodiments, introduce a stretch value that is determined based on the original configuration of vertices of the cage model and the configuration of the vertices of the deformed cage model. Therefore, the improved coordinates generated in certain embodiments herein provide a stretch value that is optimized for the particular deformation being performed. This improves the result of the deformation over conventional systems (e.g., conventional Green coordinates), which use a predefined value as stretch factor.

As used herein, the terms "cage model" or "cage" refer to a deformable mesh model that is overlayed on a 3D object. Cage models include vertices which define connected adjacent faces of the cage model. A cage model can include only quads (a quad cage model), only triangles (a triangular cage model), or a combination of quads and triangles (a triquad cage model). In the embodiments described herein, improved cage coordinates are generated for use in quad and/or triquad cage models.

As used herein, the term "triangle" or "triangle face" refers to a face of a cage model that is defined by three vertices of the cage model, which form corners of a triangle face. The three corner vertices of a triangle of the cage model are always planar (are aligned in a single 2D plane). Because corner vertices of triangles are always planar, a normal of the triangle is the same at any selected location within the triangle.

As used herein, the term "quad" or "quad face" refers to a face of a cage model that is defined by four vertices of the cage model, which are corners forming a quadrangular face. The four corner vertices of a quad of the cage model may or may not be planar. In some instances, a majority of quads of a cage model are nonplanar. In nonplanar quads, a normal at a location within the quad varies depending on a location along a surface of the quad.

Example of Using Green Coordinates in Cage Models

Green coordinates are often utilized in conventional cage models which are comprised of triangle faces. Using Green's third identity, a harmonic function is expressed in a bounded 3D domain $\Omega$ from its boundary conditions as:

$$f(\eta) = \int_{\xi \in \partial \Omega} f(\xi) \frac{\partial G}{\partial n}(\xi, \eta) d\xi - \int_{\xi \in \partial \Omega} G(\xi, \eta) \frac{\partial f}{\partial n}(\xi) d\xi \quad (1)$$

$$\text{with } G(\xi, \eta) := \frac{-1}{4\pi \|\xi - \eta\|}$$

solution to $\Delta_\xi G(\xi, \eta) = \delta_0(\|\xi - \eta\|)$, where the cage model $\partial \Omega$ is a non-intersecting closed manifold triangle mesh, and $\eta$ is a point of the 3D object located inside of the cage model. For example, the 3D object is made of a plurality (e.g., thousands, hundreds of thousands, etc.) of points in 3D space. In the following equations, deformed quantities are noted with an apostrophe and rest-pose quantities are noted without an apostrophe. In conventional Green coordinates for triangular cages, the following Dirichlet and Neumann conditions are set on the cage model $\partial \Omega$:

$$f(\xi) = \sum_i \Gamma^i(\xi) v'_i \quad (2)$$

$$\frac{\partial f}{\partial n}(\xi) = \sigma_j n'_j \forall \xi \in t_j \quad (3)$$

where $\Gamma^i$ is the "hat basis function" that takes a value of 1 on vertex i, 0 at the other vertices and is linear on each triangle (in particular, its support is a set of faces adjacent to vertex i, noted $F_1(i)$), where $\sigma_j$ (resp. $n'_j$) is the conformality factor (resp. normal) of linearly-deformed triangle $t_j$, and where both quantities are constant across the triangle $t_j$ as they depend on the (constant) triangle linear map only.

While the Dirichlet condition (Equation 2) is rather natural because the triangles' geometry is obtained from linear interpolation using $\{\Gamma^i\}i$, the Neumann condition (Equation 3) is arbitrary and set to obtain empirically appropriate deformations. Noting $(e_1, e_2)$ as two rest pose edges of triangle $t_j$ and $(e'_1, e'_2)$ as two deformed edges of the triangle $t_j$, $\sigma_j$ can be computed as:

$$\sigma_j = \sqrt{\frac{\|e'_1\|^2\|e_2\|^2 + \|e_1\|^2\|e'_2\|^2 - 2(e'_1 \cdot e'_2)(e_1 \cdot e_2)}{2\|e_1 \times e_2\|^2}} \quad (4)$$

Setting these boundary conditions results in the following compact expression for the deformation function:

$$f(\eta) = \sum_i \phi_i(\eta) v'_i + \sum_j \psi_j(\eta) \sigma_j n'_j \text{ with} \quad (5)$$

$$\phi_i(\eta) := \int_{\xi \in F_1(i)} \Gamma^i(\xi) \frac{\partial G}{\partial n}(\xi, \eta) d\xi \quad (6)$$

$$\psi_j(\eta) := \int_{\xi \in t_j} -G(\xi, \eta) d\xi \quad (7)$$

The use of the Neumann condition ensures scale invariance and results, in practice, in quasi-conformal 3D spatial deformations, as observed experimentally. However, this formulation also comes with baked-in ill behavior for degenerate triangle faces. While the unit normal is formally not defined for zero area triangles, $\sigma_j$ may be non-zero for zero area triangles, resulting in an ill-defined behavior in this (highly unconventional) case. For example, consider $e'_1$ being null and $e'_2$ non-zero length in Equation 4.

Example Operating Environment for Generating Improved Coordinates for a Cage Model for a 3D Object and Performing a Deformation Operation on the Cage Model The embodiments described herein provide improved cage coordinates for triquad and/or quad cage models and make the following technical improvements over conventional Green coordinates. Firstly, the improved cage coordinates introduce a formulation of the deformation using explicitly the on-quad-varying normal, resulting in superior deformation behavior under non-trivial cage deformations (e.g. large stretch and shear, twisting deformations), where the formulation results in per-quad-corner dedicated cage coordinates. Secondly, the validity conditions (linear precision) are included directly in the computations by introducing tessellation-independent geometric invariants. Further, efficient tessellation-based adaptive Riemann summation is introduced, allowing for fast approximate, smooth computations of the improved cage coordinates, which preserve the validity conditions exactly.

The approaches described herein for generating improved cage coordinates includes approximating coordinates propagating, in space, an ideal quad deformation model. The approximation described herein is smooth and robust, introducing four extra cage coordinates per quad (one quad coordinate per quad corner) of the cage model, while coping naturally with the presence of any triangles in the cage model with a single triangle coordinate for each triangle of the cage model. At the core of the embodiments described herein, a robust Riemann summation scheme is used in the form of an adaptive triangulation of the quad up domain which is designed in an output-sensitive way (i.e., it depending on the evaluation position). Further, the coarse deformation behavior induced by the original Neumann conditions of conventional Green coordinates (used in triangular cage models) can be recovered, resulting in smooth symmetric deformations that closely follow the limit case observed under limit refinement of bilinear quads.

Further, the approach described herein for generating a cage model including improved cage coordinates includes using, as a baseline for the Neumann condition, the deformed area over rest-pose area ratio, which results in quasi-conformal deformations, including with extreme deformations of the cage model that are not "natural looking" deformations.

Referring now to the drawings, FIG. 1 depicts an example of a computing environment 100 for generating cage coordinates 103 for a cage model 102 of a 3D object 101 and performing a deformation operation on the cage model 102. The computing environment 100 includes scene modeling system 110, which can include one or more processing devices that execute a cage coordinates generation subsystem 114, a cage deformation subsystem 116, and a scene rendering subsystem 118. In certain embodiments, each of the cage coordinates generation subsystem 114, the cage deformation subsystem 116, and the scene rendering subsystem 118 is a network server or other computing device connected to a network 130. The cage coordinates generation subsystem 114 accesses or otherwise receives a 3D object 101. For example, the cage coordinates generation subsystem 114 accesses the 3D object 101 from a data storage unit 111 of the scene modeling system 110 or otherwise accessible to the scene modeling system 110. In another example, the cage coordinates generation subsystem 114 receives the 3D object 101 from the modeling application 121 via the network 130 along with a cage model 102 representing the 3D object 101. In certain examples, the 3D object 101 is represented in a 3D virtual space with the cage model 102 overlaying the 3D object 101. In certain examples, the 3D object 101 is generated by a user using the modeling application 121. The cage coordinates generation subsystem 114 generates cage coordinates 103 for the cage model 102, including a vertex cage coordinate for each vertex of the cage model, four quad cage coordinates for each quad of the cage model 102, and a triangle cage coordinate for each triangle of the cage model (if the cage model 102 includes any triangles). Accordingly, the total number of cage coordinates 103 generated herein is N=V+4Q+T, where V is the number of vertices of the cage model 102, Q is the number of quads in the cage model 102, and T is the number of triangles in the cage model 102. The cage deformation subsystem 116 can perform deformation operations on the cage model 102, which change a configuration of the vertices of the cage model 102 in 3D space, and generate a modified 3D object 106 based on determining a new location for each 3D point of the 3D object 101, using a location function (e.g., a deformation function) that determines the new location based on (1) the cage coordinates 103, (2) the configuration of the cage model 102, and (3) the configuration of the deformed cage model 105. The scene modeling system 130 can store the cage coordinates 103, the cage model 102, one or more deformed cage models 105, and/or one or more modified 3D objects 106 determined based on the one or more deformed cage models 105 in the data storage unit 111. In some instances, the cage coordinates generation subsystem 114 transmits the cage coordinates 103 and the cage model 102 to the modeling application 121 via the network 130 and the modeling application 121 stores the cage coordinates 103 and the cage model 102 in the data storage unit 125 of the user computing device 120. Further details about generating the cage coordinates 103 defining the cage model 102 for the 3D object 101 are described in FIG. 2. In some embodiments, the modeling application 121 of the user computing device 110 generates the cage coordinates 103 for the cage model 102, performs deformation(s) on the cage model 102 to generate deformed cage model(s) 106, and generates modified 3D object(s) 106 based on the corresponding deformed cage model(s) 105 and the cage coordinates 103 generated herein.

The one or more processing devices of the scene modeling system 110 can further execute a cage deformation subsystem 116 for performing one or more deformation operations on the cage model 102, using the cage coordinates, 103, to generate a deformed cage model(s) 105 and modified 3D object(s) 106. In certain embodiments, the cage deformation subsystem 116 stores one or more deformed cage models 105 and the resulting one or more modified 3D objects 106 in the data storage unit 111. The cage deformation subsystem 116 can use a location function to determine new positions for each of the points of the 3D object 101 based on the cage coordinates 103 as well as configurations of vertices in both the initial cage model 102 and the deformed cage model 105. In some instances, the cage coordinates generation subsystem 114 transmits the deformed cage model(s) 105 and the resulting modified 3D object(s) 106 to the modeling application 121 via the network 130 and the modeling application 121 stores the deformed cage model(s) 105 and the modified 3D object(s) 106 in the data storage unit 125 of the user computing device 120. Further details about performing deformation operations on the cage model 102 to generate a deformed cage model 105 and modified 3D object 106 are described in FIG. 2.

The one or more processing devices of the scene modeling system 110 can further execute a scene rendering subsystem 118 for rendering the cage model 102 and the 3D object 101, and, in some instances, for rendering the deformed cage model 105 and the modified 3D object 106 on the user interface 123. For example, the scene rendering subsystem 118 communicates with the modeling application 121 via the network 121 to instruct the modeling application 121 to render the cage model 102 (or deformed cage model 105) and the 3D object 101 (or modified 3D object 106) via the user interface 123.

The scene modeling system 110 includes a data storage unit 111. An example data storage unit 111 is accessible to the scene modeling system 110 and stores data for the scene modeling system 110. In some instances, the data storage unit 111 stores a 3D object 101 and associated cage model 102 that is retrievable by the cage coordinates generation subsystem 114 for use in generation of cage coordinates 103 for the cage model 102. In some instances, the data storage unit 111 stores cage coordinates 103 generated by the cage coordinates generation subsystem 114, for the cage model 102 (e.g. a triquad cage model 102 or a quad cage model 102). In some instances, the cage deformation subsystem 116, responsive to requests from the modeling application 121, deforms the cage model 102 to generate a deformed cage model 105 and a modified 3D object 106 and stores the deformed cage model 105 and the modified 3D object 106 in the data storage unit 111. Generating the modified 3D object 106 based on the deformed cage model 105 includes determining, for each point of the 3D object 101, a new location using a location function that is based on the cage coordinates 103, the configuration of vertices in the (non-deformed) cage model 102, and the configuration of vertices in the deformed cage model 105. In some instances, the data storage unit 111 is accessible to the user computing device 120 via the network 130. For example, the modeling application 121 can access data stored in the data storage unit 111 via the network 130.

An example user computing device 120 includes a modeling application 121, a user interface 123, and a data storage unit 125. In certain embodiments, the user computing device 120 is a smart phone device, a personal computer (PC), a tablet device, or other user computing device 120. In some embodiments, the user computing device 120 communicates with the scene modeling system 110 via the network 130.

The modeling application 121, in some embodiments, is associated with the scene modeling system 110 and the user downloads the modeling application 121 on the user computing device 120. For example, the user accesses an application store or a website of the scene modeling system 110 using the user computing device 120 and requests to download the modeling application 121 on the user computing device 120. The modeling application 121 operates on the user computing device 120 and enables a user of the user computing device 120 to retrieve a 3D object 101, retrieve a cage model 102 to overlay the 3D object 101, and display the cage model 102 and 3D object 101 via the user interface 123. The modeling application 121 enables the user to interact, via the user interface 123 with the cage model 102 to deform the cage model 102 and, consequently, deform the 3D object 101. The modeling application 121 can communicate with the user interface 123 to receive one or more inputs from the user. The modeling application 121 can instruct the user interface 123 to display the 3D object 101 and the cage model 102 and can instruct the user interface 123 to deform the cage model 102 to generate a deformed cage model 105 and generate a modified 3D object 106 based on determining a new location for each 3D point of the 3D object 101, using a location function that determines the new location based on (1) the cage coordinates 103, (2) the configuration of the input cage model 102, and (3) the configuration of the deformed cage model 105. In some embodiments, the modeling application 121 communicates with one or more of the cage coordinates generation subsystem 114, the cage deformation subsystem 116, the scene rendering subsystem 118, or the data storage unit 111 of the scene modeling system 110.

In certain embodiments, the modeling application 121 includes the cage coordinates generation subsystem 114, the cage deformation subsystem 116 and the scene rendering subsystem 118 and performs the operations described herein as being performed by the subsystems 114, 116, and 118. For example, in certain embodiments, the modeling application 121 of the user computing device 110 can generate cage coordinates 103 for the cage model 102 described herein, perform deformation operations on the cage model 102 to generate deformed cage model(s) 105, and generate updated 3D object(s) for the corresponding deformed cage model(s) 105 using the cage coordinates 103 by applying a location function to translate each of a set of 3D points defining the 3D object, as described herein.

The data storage unit 125 is accessible to the user computing device 120 and stores data for the user computing device 120. In some instances, the data storage unit 120 stores a 3D object 101 that is retrievable by the modeling application 121 for use in generation of cage coordinates 103 for cage model 102. In some instances, the data storage unit 125 stores cage coordinates 103 for the cage model 102 (e.g. a triquad cage model 102 or a quad cage model 102). In some instances, the modeling application 121, responsive to receiving one or more inputs from the user via the user interface 123, deforms the cage model 102 to generate a deformed cage model 105 and a modified 3D object 106 and stores the deformed cage model 105 and the modified 3D object 106 in the data storage unit 125. In some instances, the data storage unit 125 is accessible to the scene modeling system 110 via the network 130. For example, the scene modeling system 110 can access data stored in the data storage unit 125 via the network 130.

The user interface 123 can include a touchscreen display interface, a display device (e.g. a monitor) with a separate input device (e.g. a mouse), or other user interface 123 which can receive one or more inputs from the user and display information or provide other output to the user. For example, the user interface 123 can display a 3D object 101 selected by the user as well as display a cage model 102 associated with the 3D object 101. In some instances, the user interface 123 displays the cage model 102 overlaying the 3D object 101. The user interface 123 receives one or more inputs from the user to request that one or more deformation operations be performed on the cage model 102 to generate a deformed cage model 105 and a resulting modified 3D object 106. For example, the user may select and drag one or more vertices of the cage model 102 to request performance of the deformation operation(s). In some instances, the user interface 123 displays the deformation operation being performed. For example, the deformation involves stretching the cage model 102 by changing a position of one or more vertices of the cage model 102 and the user interface 123 displays one or more intermediate configurations of the cage model 102 as well as the final configuration of the deformed cage model 105. The configuration of vertices in the deformed cage model 105 is also used, in addition to the cage coordinates 103, to determine a change in shape of the 3D object 101. The user interface 123 displays the modified 3D object 106 having a shape corresponding to the deformed cage model 105.

As depicted in FIG. 1, the scene rendering subsystem 118 can instruct the user interface 123 to render a cage model 102 associated with the 3D object 101. For example, the user accesses the modeling application 121 and selects (e.g. via one or more user interface 123 objects and/or menus) the 3D object 101 for display. The scene modeling system 110 receives the selection of the 3D object 101 and generates cage coordinates 103 for the cage model 103. The scene rendering subsystem 118 instructs the modeling application 121 to display, via the user interface 123, the cage model 102 around the displayed 3D object 101. For example, the cage model 102 overlays (e.g. envelops) the 3D object 101. As depicted in FIG. 1, the user selects a cage vertex 104 on a cage model 102 via the user interface 123. In some instances, the user can select two or more selected cage vertices 104. The deformation operation may involve, for vertices of the cage model 102 affected by the deformation operation, a change a position of the vertex, a change in a distance between the vertex and one or more neighboring vertices in the cage model, and/or a change in a direction from the vertex to one or more neighboring vertices in the cage model. In certain examples, the user drags the selected cage vertex 104 from a first location to a second location in the user interface 125 to perform the deformation operation. In other examples, the user drags two or more selected cage vertices 104 from initial locations to subsequent locations within the 3D space. As depicted in FIG. 1, at a time after the user performs the deformation operation on the cage model 102 (e.g. by dragging or otherwise interacting with the selected cage vertex 104), the scene rendering subsystem 118 instructs the modeling application 121 to display a deformed cage model 105 generated by the cage deformation subsystem 116 as well as the modified 3D object 106 that is determined based on the deformed cage model 105 and the cage coordinates 103.

The scene modeling system 110, including the cage coordinates generation subsystem 114, the cage deformation subsystem 116, and the scene rendering subsystem 118, may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the scene modeling system 110 can be implemented using more or fewer systems or subsystems than those shown in FIG. 1, may combine two or more subsystems, or may have a different configuration or arrangement of the systems or subsystems.

Examples of Computer-Implemented Operations for Generating Improved Cage Coordinates for a Cage Model and Performing a Deformation Operation on the Cage Model FIG. 2 depicts an example of a method for generating cage coordinates 103 for a cage model 102 of a 3D object 101 and performing a deformation operation on the cage model 102. One or more computing devices (e.g., the scene modeling system 110 or the individual subsystems contained therein) implement operations depicted in FIG. 2. For illustrative purposes, the process 200 is described with reference to certain examples depicted in the figures. Other implementations, however, are possible.

In the embodiments described herein, the scene modeling system 110 is separate from the user computing device 120 and communicates with the user computing device 120 via the network 130. However, in some embodiments, the scene modeling system 110 is a component of the user computing device 120 and the operations described herein as performed by the scene modeling system 110 (or one or more of the subsystems 114, 116, or 118 thereof) are performed by the modeling application 121 of the user computing device 120. In some embodiments, the scene modeling system 110 is separate from the user computing device 120 but one or more operations described herein as performed by the scene modeling system 110 (or one or more subsystems 114, 116, 118 thereof) are performed by the modeling application 121 of the user computing device 120.

At block 210, the method 200 involves accessing, by the cage coordinates generation subsystem 114, a three-dimensional (3D) object 101 and a cage model 102 associated with the 3D object 101, the cage model 102 including a first configuration of vertices. The 3D object 101 may be of a car, a human face, a building, clothing, a plant, or other object. The 3D object 101, in some instances, can be displayed in a 3D virtual space. In some instances, the 3D virtual space represents an environment such as a room or an outdoor space. The 3D object 101 may include defined dimensions, contours, or other information which defines a volume occupied by the 3D object 101 within the 3D virtual space. In some instances, the scene modeling system accesses the 3D virtual space including the 3D object 101 responsive to receiving a user input. For example, a user accesses the modeling application 121 (or web browser application) executing on the user computing device 120, selects one or more objects on the user interface 123 of the user computing device to request to access the 3D object 101 or generate a new 3D object 101. The scene modeling system 110 receives the inputs of the user and accesses the 3D object 101 responsive to receiving the user selection, and the scene modeling system 110 provides the 3D object 101 for display via the user interface 123 of the user computing device. As previously discussed, the configuration of vertices of the cage model 102 is such that cage model 102 is a quad or a triquad cage.

At block 220, the method 200 involves generating, by the cage coordinates generation subsystem 114, cage coordinates 103 for the cage model 102. The cage coordinates 103 include the vertex coordinate for each vertex of the cage model 102, the triangle coordinate for each triangle of the cage model 102, and the four quad coordinates for each quad of the cage model 102.

At sub-block 221, the method for implementing block 220 of method 200 involves determining vertices associated with quads and triangles of the cage model 102 generated in sub-block 221. In some instances, the cage model 120 comprises a triquad cage model or a quad cage model. For example, cage models 102 include vertices which form a connected mesh of quadrangular (4-sided, quad) and/or triangular (3-sided, triangle) faces. Quad cage models 102 only include interconnected quads. Triquad cage models 102 include an interconnected combination of quads and triangles. Vertices (corners) of a quad/triangle face of the cage model 102 are shared in common with adjacent face(s) of the cage model 102. Triangles are defined by three vertices (corners) within the 3D virtual space which lie in a common two-dimensional (2D) plane. Quads are defined by four vertices within the 3D virtual space, which may or may not lie in a common 2D plane. In some instances, most if not all of the quads of a quad cage model 102 or of a triquad cage model 102 are non-planar. In certain embodiments, the cage coordinates generation subsystem 114 determines vertices of the cage model, quads and/or triangles formed from sets of the vertices and labels/numbers each of the vertices, quads, and/or triangles.

At sub-block 223, the method for implementing block 220 of method 200 involves determining, for each quad of the cage model 102, a normal for the four corner vertices of the quad. For any quad, q, of the cage model 102 with corners $(q_0, q_1, q_2, q_3) \in \mathbb{R}^{3\times4}$ a bilinear sheet is given by $\Sigma_{k=0}^{3} b_{uv}^{k} q_k$ with $(b_{uv}^{0}, b_{uv}^{1}, b_{uv}^{2}, b_{uv}^{3})=((1-u)(1-v), u(1-v), uv, (1-u)v) \in \mathbb{R}^4$ being the bilinear coordinates at parameters $(u, v) \in \mathbb{R}^2$, and its bilinear quad is restricted to $(u, v) \in [0,1]^2$. The values $b_{uv}^{0}, b_{uv}^{1}, b_{uv}^{2}, b_{uv}^{3}$ are barycentric weights defining a given point on the quad. Given this parameterization of the quad, the cage coordinates generation subsystem 114 can determine the tangent vectors $\partial_x q_{uv}$, normal $n_{uv}$, and surface element $dq_{uv}$ of the quad as:

$$\partial_u q_{uv} = (1-v)(q_1-q_0) + v(q_2-q_3) \quad (8)$$

$$\partial_u q_{uv} = (1-u)(q_3-q_0) + u(q_2-q_1) \quad (9)$$

$$N_{uv} := \partial_u q_{uv} \times \partial_v q_{uv} = \Sigma_{k=0}^{3} b_{uv}^{k} N_k^q \quad (10)$$

$$n_{uv} = N_{uv}/\|N_{uv}\| \quad (11)$$

$$dq_{uv} = \|N_{uv}\| du dv \quad (12)$$

with $N_k^q := (q_{k+1}-q_k) \times (q_{k+3}-q_k)$ (indices being taken as modulo 4) being the unnormalized normal at a particular corner k of the quad q. A normal for each corner vertex associated with the quad can therefore be determined using the cross product of the edges adjacent to the vertex and, for any particular location on the quad, a location-varying normal $n_{uv}$ can be determined based on the four corner vertex normal (Eq.(10) and (11)). An illustration of a normal $N_k^q$ at each corner k of a quad and a location varying normal $n_{uv}$ at multiple locations on the quad in a cage model 102 is provided in FIG. 3.

While the location-varying normal n uv of the quad is not a bilinear interpolant, the non-normalized normal, $N_{uv}$, is a bilinear function interpolating the unnormalized normal at a particular corner of the quad $\{N_k^q\}$ (see Eq.(10)). The cage coordinates generation subsystem 114 determines a uv-varying area-based Neumann condition, represented as:

$$\frac{\partial f}{\partial n}(q_{uv}) = \sigma_{nv}^q n'_{uv} \forall q_{uv} \in q \quad (13)$$

$$\sigma_{nv}^q := \frac{\|N'_{uv}\|}{\|N_{uv}\|} \quad (14)$$

The Neumann condition of Equations 13 and 14 defines how the location function (deformation function) $f(\eta)$ (see equation 15 below) should vary across the quad in the direction of its normal.

At sub-block 225, the method for implementing block 220 of method 200 involves determining, for each triangle of the cage model 102, a non-varying normal for the triangle. For triangles of a cage model 102, the three corner vertices are planar, therefore the normal for the triangle is the same at any location within the triangle. As previously discussed, some cage models 102 include triangle faces (e.g., triquad cages) while other cage models 102 (quad cages) do not include triangles. In some embodiments however, the cage model 102 is a quad cage model and the method for implementing block 220 does not include sub-block 227 because the cage model 102 does not include triangles. In these embodiments involving use of a quad cage model 102, the method for implementing block 220 proceeds directly from sub-block 223 to sub-block 227.

At sub-block 227, the method for implementing block 220 of method 200 involves determining, using a location function, one or more points on the 3D object 101 corresponding to one or more locations on the cage model 102 based on the cage coordinates 103 determined in sub-blocks 223, 225, and 227. The cage coordinates generation subsystem 114 defines a function for determining locations of points on the 3D object 101 (or points within the virtual space that includes the 3D object 101) using the cage coordinates 103 for the cage model 102, as well as the configurations of vertices in both the (non-deformed) cage model 102 and the deformed cage model 105 as follows:

$$f(\eta) = \sum_i \phi_i(\eta) v'_i + \sum_{t \in \mathcal{T}} \psi_t(\eta) \sigma_t n'_t + \sum_{q \in Q} \sum_{k=0}^{3} \psi_k^q(\eta) N_k^{q'} \quad (15)$$

The cage generation system 114 can determine a quad's contribution $\phi_k^q(\eta)$ to the $\phi$ coordinate of each of its corner vertices and obtain the per-corner $\psi$ coordinates $\psi_k^q(\eta)$ as follows:

$$\phi_k^q(\eta) = \int_{u,v=0}^{1} \frac{b_{u,v}^k (q_{uv} - \eta) \cdot N_{uv}}{4\pi \|q_{uv} - \eta\|^3} du dv \quad (16)$$

$$\psi_k^q(\eta) = \int_{u,v=0}^{1} \frac{b_{u,v}^k}{4\pi \|q_{uv} - \eta\|} du dv \quad (17)$$

where the cage model 102 has $|\mathcal{V}|+|\mathcal{T}|+4|Q|$ coordinates, where the cage model 102 is made of $|\mathcal{V}|$ vertices, $|\mathcal{T}|$ triangles, and |Q| quads. Stretching conditions of the quads of the cage model 102 are directly met through use of the unnormalized corner normals $N_k^q$.

However, the integrals in Equations 16 and 17 do not admit known closed-form expressions. To guarantee linear precision, two geometric invariants can be derived and used to establish constraints on computation of values in Equations 16 and 17, and establishing constraints ensures validity (i.e. linear precision) of coordinates. The cage coordinates generation subsystem 114 considers a quad q and a tessellation of the quad q into a set of triangles $t^j=(t_0^j, t_1^j, t_2^j) \in \mathbb{R}^{3 \times 4}$. Considering the respective contributions of each of the set of triangles in the discretization of the integrals in Equation 1, the following expression can be derived:

$$\sum_{k=0}^{3} \phi_k^q(\eta) q_k + \psi_k^q(\eta) N_k^q = \sum_j \sum_{k=0}^{2} \phi_{t_k^j}^{t^j}(\eta) t_k^j + \sum_j \psi_{t^j}(\eta) n_{t^j} \quad (18)$$

which guarantees linear precision. Further, because $$\int_{\xi \in q} \frac{\partial G}{\partial n}(\xi, \eta) d\xi =: \omega_q(\eta)/(4\pi),$$

where $\omega_q(\eta)$ represents the signed solid angle of q at point $\eta$, it can be concluded that:

$$\sum_{k=0}^{3} \phi_k^q(\eta) = \sum_j \sum_{k=0}^{2} \phi_{t_k^j}^{t^j}(\eta) \quad (19)$$

The cage coordinates generation subsystem 114 can use these expressions (Equations 18 and 19) to ensure that the cage coordinates 103 are compatible with ground truth coordinates approximated by the cage coordinates generation subsystem 114.

The constraints of Equations 18 and 19 can be put into matrix form. Noting $\Phi := (\phi_0^q, \phi_1^q, \phi_2^q, \phi_3^q, \psi_0^q, \psi_1^q, \psi_2^q, \psi_3^q) \in \mathbb{R}^8$ as unknowns (omitting $\eta$ for clarity), Equations 18 and 19 can be represented in matrix form as:

$$A_q \cdot \Phi = m_q(\eta) \in \mathbb{R}^4 \quad (20)$$

$$A_q := \begin{pmatrix} q_0 & q_1 & q_2 & q_3 & N_0^q & N_1^q & N_2^q & N_3^q \\ 1 & 1 & 1 & 1 & 0 & 0 & 0 & 0 \end{pmatrix} \in \mathbb{R}^{4 \times 8} \quad (21)$$

where the least-norm solution $\bar{\Phi}$ to Equation 20, and the four 8D vectors $k_i \in \mathbb{R}^8$, $i \in [0,3]$ spanning the null space of $A_q$ are obtained using the singular value decomposition (SVD) of $A_q$. The missing components $\lambda_i$ along the null space of $A_q$ can be expressed as $\Phi = \bar{\Phi} + \sum_{i=0}^{3} \lambda_i \kappa_i$, where if $\Delta_i$ is in the null space of the linear precision constraints described in Equation 18, any choice of $\lambda_i$ results in linearly-precise coordinates. The cage deformation system 114 computes a smooth approximation $\bar{\Phi}$ of $\Phi$ using a smooth adaptive Riemann summation approximating Equations 16 and 17 and set $$\lambda_i = \frac{\bar{\Phi} \cdot \kappa_i}{\|\kappa_i\|^2} \frac{\|\bar{\Phi}\|^2}{\bar{\Phi} \cdot \bar{\Phi}}.$$

A standard Riemann summation, as utilized in conventional QMVC coordinates, is not robust enough to estimate the remaining four unknown components $\lambda_i$ and the cage coordinates generation subsystem 114 uses a triangulation-based approximation. The triangulation-based approximation involves triangulating the uv square domain $[0,1]^2 =: U\{t\}$, and rewriting Equations 16 as:

$$\phi_k^q(\eta) = \sum_t \frac{b_{uv_t}^k \omega_t(\eta)}{4\pi} \quad (22)$$

and rewriting Equation 17 as:

$$\psi_k^q(\eta) = \sum_t \frac{b_{uv_t}^k \psi_t(\eta)}{\|N_{uv_t}\|}, \quad (23)$$

$\omega_t(\eta)$ representing the signed solid angle of t at $\eta$, $uv_t$ representing the uv location of the center of t (obtained by simple averaging in uv-space), and t(q) representing the 3D embedding of t on the (in general, curved) quad q. To tile the uv domain with triangles, the cage coordinates generation subsystem 114, computes an appropriate uv location $(u_q, v_q)(\eta)$ using a uv-projection operator $\mathcal{P}_q: \mathbb{R}^3 \to \mathbb{R}_q$, where $\mathcal{P}$ is designed to converge to an orthogonal projection operator near q, while smoothly transiting to a simple average operator when far away from q. Further, the cage coordinates generation subsystem 114, given $(u_q, v_q)(\eta)$, generates an adaptive uv grid pattern and tiles the uv domain atop this pattern. To concentrate the sampling around $(u_q, v_q)(\eta)$ to account for the expected energy concentration resulting from the use of a $1/\|\xi-\eta\|^k$ averaging kernel, the cage coordinates generation subsystem 114 uses the following procedure to compute the uv pattern of size $(2n+1)^2$ for x=u and v:

$$x_i := \begin{vmatrix} \left[1-\left(\frac{n-i}{n}\right)^m\right] x_q(\eta) & \forall i < n \\ x_q(\eta) & i == n \\ (x_q(\eta)-1)\left[1-\left(\frac{n-i}{n}\right)^m\right]+1 & \forall n+1 \leq i \leq 2n \end{vmatrix} \quad (24)$$

In some embodiments, m=3. However, other predetermined values for m may be used.

To obtain computations that are equivalent to the smooth integrals (Equations 16 and 17) on quads, the cage coordinates generation subsystem 114 ensures that $\eta$ remains on the correct side of the tessellated surface. For example, $\eta$ should not be inside a volume delimited by q and its tessellation. This condition ensures that the notion of interior/exterior remains unchanged, within the cage coordinates 103, from the point of view of $\eta$ (in particular, the second invariant is the solid angle of q at $\eta$). To obtain valid tessellations for arbitrary $\eta \in \Omega$, the cage coordinates generation subsystem 114 uses the adaptive tessellation introduced in the previous paragraph and uses the fact that $P_q$ tends to the orthogonal projection operator around q.

It is possible for the cage coordinates generation subsystem 114 to "insert back" in some sense the Neumann conditions described in Equation 13. While the following stretch factors (where $\partial_u, \partial_v, \partial'_u, \partial'_v$ denote the tangent vectors):

$$\sigma_{uv}^L := \sqrt{\frac{\|\partial_u'\|^2\|\partial_v\|^2 + \|\partial_u\|^2\|\partial_v'\|^2 - 2(\partial_u' \cdot \partial_v')(\partial_u \cdot \partial_v)}{2\|\partial_u \times \partial_v\|^2}} \quad (25)$$

$$\sigma_{uv}^A := \frac{\|\partial_u' \times \partial_v'\|}{\|\partial_u \times \partial_v\|} = \frac{\|N_{uv}'\|}{\|N_{uv}\|} \quad (26)$$

differ for a given quad deformation, the ratio of the stretch factors does not vary much across the quad, and it can be factored outside the integrant without deviating noticeably from the global deformation behavior induced by the Green coordinates under limit refinement of the quads into triangles. This pointwise deviation is visibly averaged out once integrated and, the per-quad corner correction factor can be computed as:

$$\phi_q^k := \int_{u,v=0}^{1} b_{uv}^k \sigma_{uv}^L dq_{uv} \bigg/ \int_{u,v=0}^{1} b_{uv}^k \sigma_{uv}^A dq_{uv} \quad (27)$$

that estimates, on average, the uv-varying ratio $\sigma_{uv}^L/\sigma_{uv}^A$, using $b_{uv}^k$ as the importance sampler and accounting for varying local area density (using $dq_{uv}$ as a differential element and not just dudv). For example, these expressions can be approximated using a fixed regular uv pattern and can be simplified as $dq_{uv}/\|\partial_u \times \partial_v\| = dq_{uv}/\|N_{uv}\| = dudv$. Using these correction factors leads to the following final expression used by the cage coordinates generation subsystem 114 for determining a location based on the cage coordinates 103 for triquad (or quad) cages 102:

$$f(\eta) = \sum_i \phi_i(\eta) v_i' + \sum_{t \in \mathcal{J}} \psi_t(\eta) \sigma_t n_t' + \sum_{q \in Q} \sum_{k=0}^{3} \psi_k^q(\eta) \sigma_q^k N_k^{q'} \quad (28)$$

In some embodiments, the cage coordinates generation subsystem 114 implements a simple 5×5 sampling pattern to approximate these integrals in Equation 27. However, other sampling patterns may be implemented instead of the simple 5×5 pattern.

The scene modeling system 110 defines a set of points on the 3D object 101 prior to receiving a selection of at least a selected vertex 104 on the cage model 102 and prior to receiving a request to perform a deformation operation on the cage model 102 by moving at least the selected vertex 104 to a new location.

At block 230, the method 200 involves deforming, by the cage deformation subsystem 116 responsive to receiving an input, the cage model 102 by changing the first configuration of vertices to a second configuration that is different from the first configuration. Responsive to receiving an input to a particular point 104 of the points 104 on the cage model 102, the cage deformation subsystem 116 deforms the cage model 102 via the particular point 104 on the cage model 102. For example, the cage deformation subsystem 116 receives a selection of the particular point 104 on the cage model 102 and performs a deformation operation on the cage model 102 at the selected particular point 104. A deformation operation can include one or more of stretching, compressing, indenting, pulling, smoothing, rotating, or other manipulation of the cage model 102 at the selected particular point to generate a deformed cage model 105 which has a different configuration of vertices from the original cage model 102. Deforming the cage model 102 at the particular point may, for vertices of various faces (e.g. quads and triangles) of the cage model 102 affected by the deformation operation, change a position of the vertex, a distance between the vertex and one or more neighboring vertices in the cage model 102, and/or a direction from the vertex to one or more neighboring vertices in the cage model 102 to generate the deformed cage model 105, such that the deformed cage model 105 is in a second configuration of vertices that is different from the first configuration of vertices of the cage model 102 prior to the deformation operation being performed.

At block 240, the method 200 involves updating, by the cage deformation subsystem 116, locations of points on the 3D object 101 based on the deformed cage model 105 and the cage coordinates 103. After the deformation operation is performed, a respective location of each of the points on the 3D object 101 can be updated to generate the modified 3D object 106 by multiplying their underlying cage coordinates 103 with the deformed cage model 105. For example, if the surface of the 3D object 101 has N points, Equation 28 is applied to each of the N points to determine an update location for each of the N points.

Figure 3:
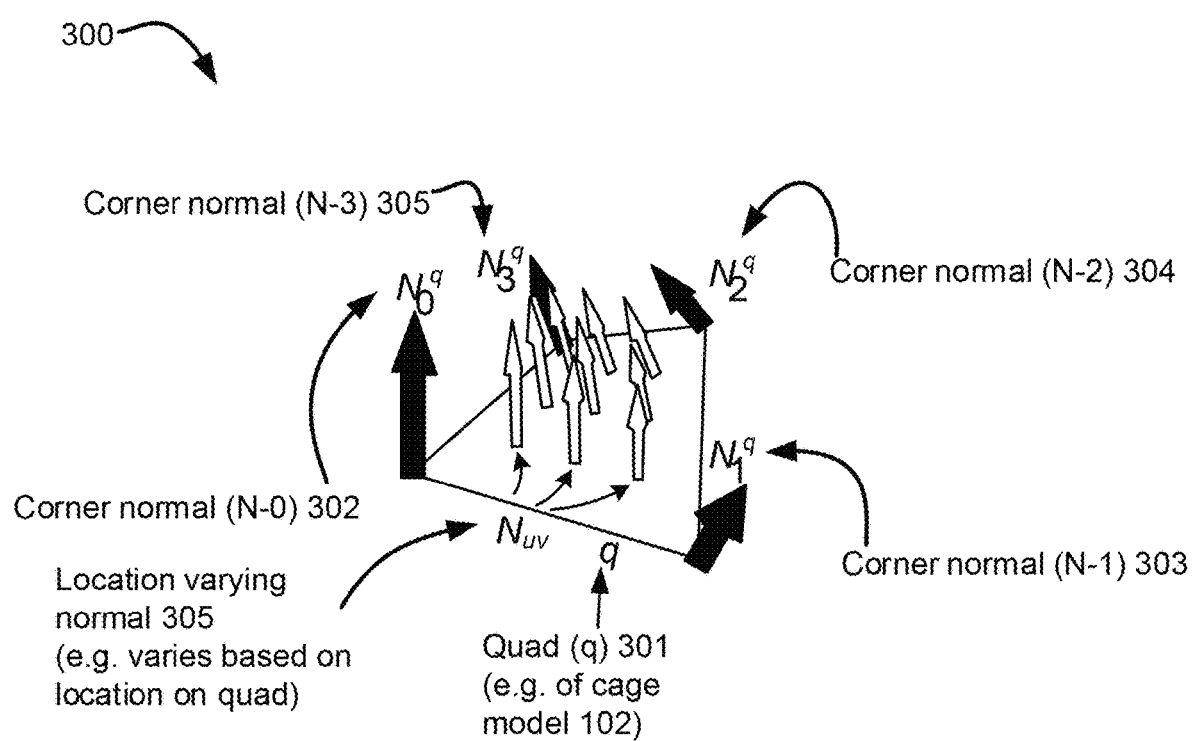
FIG. 3 illustrates a normal determined at each corner vertex of a quad of a cage model and a relationship between corner vertex normals and a location varying normal at multiple locations on the quad, according to certain embodiments disclosed herein.

FIG. 3 illustrates a normal determined at each corner vertex of a quad of a cage model and a relationship between corner vertex normals and a location varying normal at multiple locations on the quad, according to certain embodiments disclosed herein As shown in FIG. 3, a quad (q) 301 of a cage model 102 includes corner normals 302, 303, 304, and 305 for the quad at corners N-0, N-1, N-2, and N-3, respectively. The corner normals 302, 303, 304, and 305 are represented on the quad 301 in FIG. 3 as $N_0^q$, $N_1^q$, $N_2^q$, and $N_3^q$, respectively. As shown by the orientation of the arrows, which represent a direction of normals, each of the corner normals 302, 303, 304, and 305 is oriented in a different direction from the other corner normals, which indicates that the quad 301 is non-planar. Because the quad 301 is non-planar, the location varying normal 305 (depicted as N uv) is different at different locations within the quad 301 as defined by uv coordinates, indicated by the normal arrows that begin at slightly different locations within the quad 301 extending in slightly different directions. The location varying normal 305 at a particular location within the quad 301 can be determined based on the uv coordinate defining the location within the quad 301 as well as the four corner normals 302, 303, 304, and 305.

Figure 4:
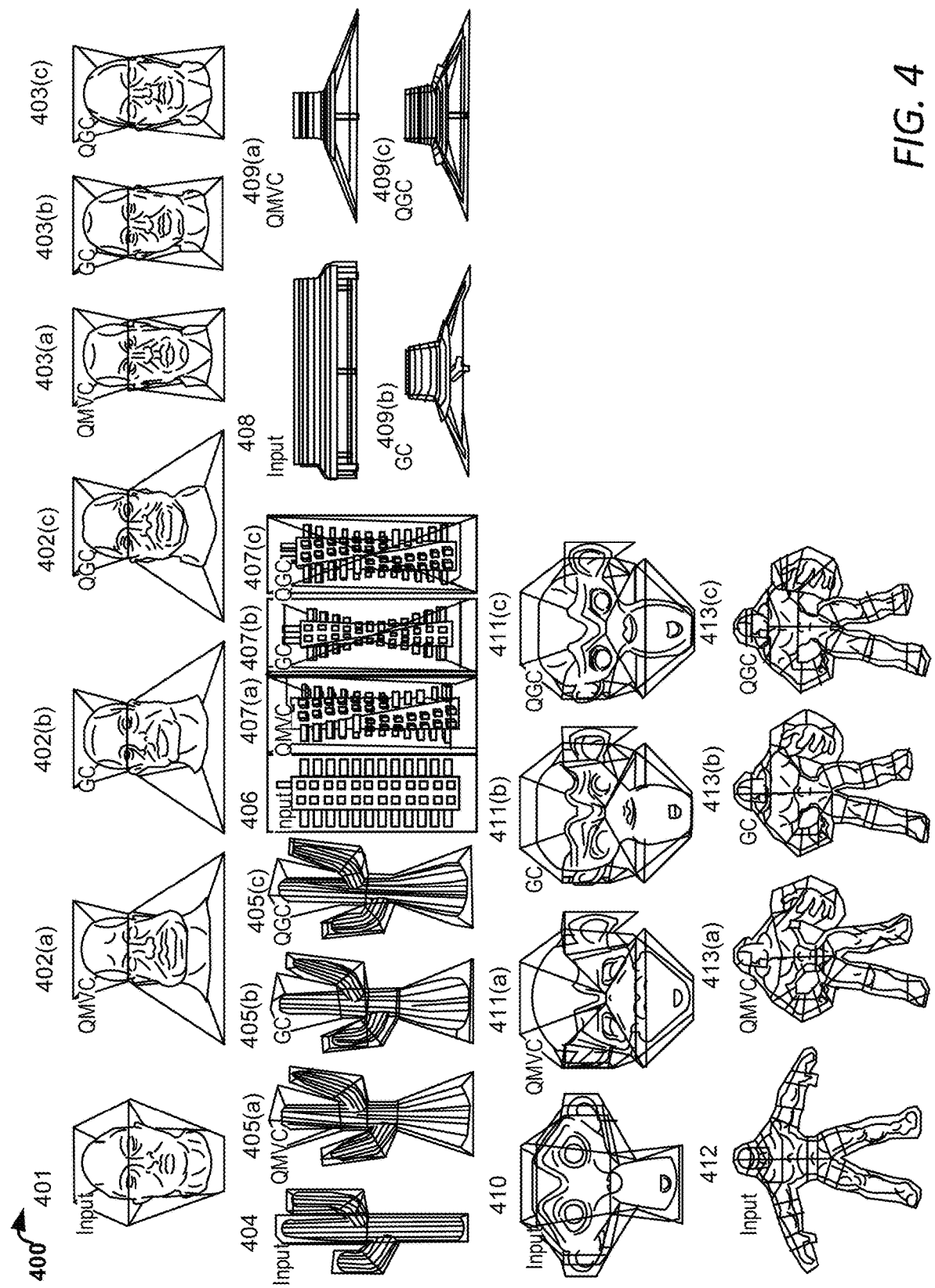
FIG. 4 illustrates a comparison of results of deformation operations performed utilizing the improved cage coordinates described herein compared to results of equivalent deformation operations performed on equivalent cage models using conventional cage coordinates.

FIG. 4 illustrates a comparison of results of deformation operations performed utilizing the improved cage coordinates described herein compared to results of equivalent deformation operations performed on equivalent cage models using conventional cage coordinates. As shown in FIG. 4, various input cages overlaying various 3D objects 101 are shown. For example input cage 401 overlaying a face object, input cage 404 overlaying a cactus 3D object 101, input cage 406 overlaying another 3D object 101, input cage 408 overlaying a bench 3D object 101, input cage 410 overlaying a primate 3D object 101, and input cage 412 overlaying a body 3D object 101.

Deformation operations performed on these input cages 401, 404, 406, 408, 410, and 412 using conventional QMVC coordinates are shown in FIG. 4 and are labeled with an "(a)" (see deformations 402(a) performed on input cage 401, deformation 403(a) performed on input cage 401, deformation 405(a) performed on input cage 404, deformation 407(a) performed on input cage 406, deformation 409(a) performed on input cage 408, deformation 411(a) performed on input cage 410, and deformation 413(a) performed on input cage 412). In each of these deformations, the input cage is defined using conventional QMVC coordinates.

Deformation operations performed on these input cages 401, 404, 406, 408, 410, and 412 using conventional Green coordinates (GC) for triangular cages are shown in FIG. 4 and are labeled with an "(b)" (see deformations 402(b) performed on input cage 401, deformation 403(b) performed on input cage 401, deformation 405(b) performed on input cage 404, deformation 407(b) performed on input cage 406, deformation 409(b) performed on input cage 408, deformation 411(b) performed on input cage 410, and deformation 413(b) performed on input cage 412). In each of these deformations, the input cage is defined using conventional Green coordinates for triangular cages. For example, in each of the deformations 402(b), 403(b), 405(b), 407(b), 409(b), 411(b), and 413(b), the respective input cages are triangular cages defined using conventional Green coordinates, which assign a single non-varying normal value to each triangle of the input cage. Note that, while not depicted in this figure, each quad of the cage has been cut into two triangles for the unique case of the traditional triangle-based Green Coordinates GC.

Deformation operations performed on these input cages 401, 404, 406, 408, 410, and 412 using the improved coordinates described in certain embodiments herein (e.g. the improved cage coordinates 203 generated via the method 200 of FIG. 2) are shown in FIG. 4 and are labeled with an "(c)" (see deformations 402(c) performed on input cage 401, deformation 403(c) performed on input cage 401, deformation 405(c) performed on input cage 404, deformation 407(c) performed on input cage 406, deformation 409(c) performed on input cage 408, deformation 411(c) performed on input cage 410, and deformation 413(c) performed on input cage 412). In each of these deformations, the 3D object's deformation is defined using the improved cage coordinates for quad and/or triquad cages described herein (e.g. as described in FIGS. 1 and 2), which assign a location varying normal for quads of the input cage as well as a non-varying normal for triangles of the input cage.

The deformations in FIG. 4 performed using the various coordinate systems (e.g. QMVC deformations labeled as "(a)," the GC deformations labeled as "(b)," and the deformations performed using the improved coordinates described herein labeled as "(c),") are equivalent deformation operations performed on the cage, but result in different results with respect to the resulting modified 3D object 101. In the deformations 402(a), 403(a), 405(a), 407(a), 409(a), 411(a), and 413(a), performed using corresponding input cages 401, 401, 404, 406, 408, 410, and 412 defined according to conventional QMVC-based coordinates, the modified 3D objects resulting from the deformation operation include a loss of volume preservation when compared to the corresponding deformations 402(c), 403(c), 405(c), 407(c), 409 (c), 411(c), and 413(c) performed using the improved cage coordinates 103 described herein on the same respective input cage. In the deformations 402(b), 403(b), 405(b), 407(b), 409(b), 411(b), and 413(b), performed using corresponding input cages 401, 401, 404, 406, 408, 410, and 412 defined according to conventional Green coordinates for triangular cages (GC), the modified 3D objects generated from the resulting deformation include a loss of symmetry when compared to the corresponding deformations 402(c), 403(c), 405(c), 407(c), 409(c), 411(c), and 413(c) performed using the improved cage coordinates 103 described herein on the same respective input cage.

For example, the deformations 402(a), 402(b), and 402(c) involve widening a distance between the two bottom-most vertices of the input cage model to widen a neck and chin of the human face 3D object 101 as well as a narrowing of the distance between the vertices on the sides of the human face 3D object 101. However, as can be seen in FIG. 4, the deformation 403(c) using the improved cage coordinates 103 described herein results in a preservation of volume in the deformed 3D object 101, which does not occur in the conventional QMVC-based deformation of 402(a), which shows the neck being stretched to an unrealistic degree compared to a stretching of the chin and cheeks. The deformation 402(c) using the improved cage coordinates 103 also does not introduce any asymmetric artifacts as the conventional GC-based deformation of 402(b), which shows the nose and chin tilted to the left, whereas the deformation 402(c) maintains the symmetry of the 3D object 101.

For example, the deformations 403(a), 403(b), and 403(c) involve a reconfiguration of the vertices of the input cage 401 to decrease a distance between the vertices on the right and left sides of the face as well as increase the distance between the vertices on either side of the neck of the face. However, as can be seen in FIG. 4, the deformation 403(c) using the improved cage coordinates 103 described herein results in a preservation of volume in the deformed 3D object 101, which does not occur in the conventional QMVC-based deformation of 403(a), which shows an unrealistic face compression (a rectangle instead of oval shape). The deformation 403(c) using the improved cage coordinates 103 also does not introduce any asymmetric artifacts as the conventional GC-based deformation of 402(b), which shows the nose, chin, and mouth tilted slightly off center in a leftward direction, whereas the deformation 402(c) maintains a symmetry of the 3D object 101.

Examples of Computing Environments for Implementing Certain Embodiments

Figure 5:
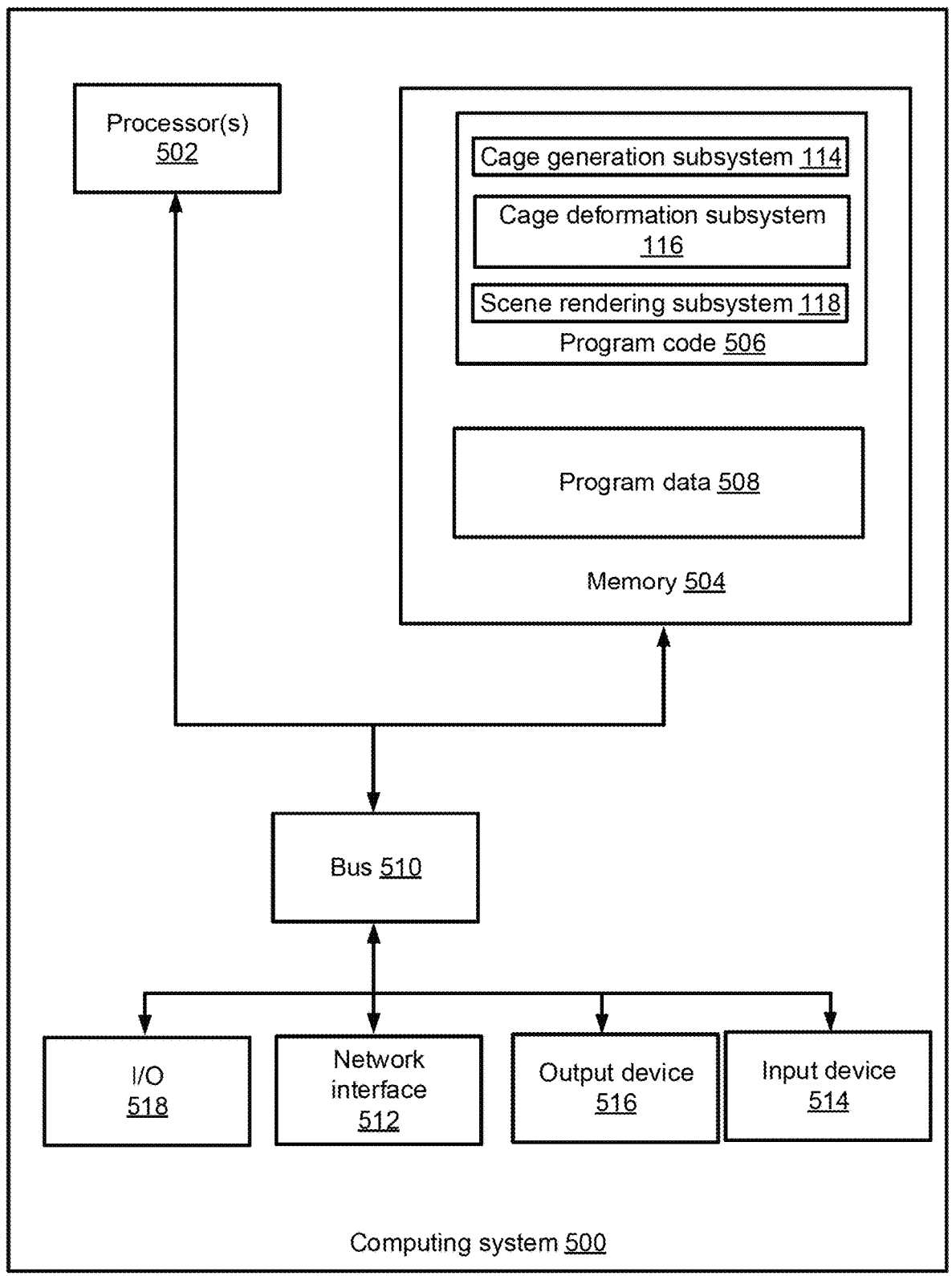
FIG. 5 depicts an example of a computing system that performs certain operations described herein, according to certain embodiments described in the present disclosure.

Any suitable computer system or group of computer systems can be used for performing the operations described herein. For example, FIG. 5 depicts an example of a computer system 500. The depicted example of the computer system 500 includes a processing device 502 communicatively coupled to one or more memory components 504. The processing device 502 executes computer-executable program code stored in a memory components 504, accesses information stored in the memory component 504, or both. Execution of the computer-executable program code causes the processing device to perform the operations described herein. Examples of the processing device 502 include a microprocessor, an application-specific integrated circuit ("ASIC"), a field-programmable gate array ("FPGA"), or any other suitable processing device. The processing device 502 can include any number of processing devices, including a single processing device.

The memory components 504 includes any suitable non-transitory computer-readable medium for storing program code 506, program data 508, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the memory components 504 can be volatile memory, non-volatile memory, or a combination thereof.

The computer system 500 executes program code 506 that configures the processing device 502 to perform one or more of the operations described herein. Examples of the program code 506 include, in various embodiments, the scene modeling system 110 (including the cage coordinates generation subsystem 114, the cage deformation subsystem 116, and the scene rendering subsystem 118) of FIG. 1, which may include any other suitable systems or subsystems that perform one or more operations described herein (e.g., one or more neural networks, encoders, attention propagation subsystem and segmentation subsystem). The program code 506 may be resident in the memory components 504 or any suitable computer-readable medium and may be executed by the processing device 502 or any other suitable processor.

The processing device 502 is an integrated circuit device that can execute the program code 506. The program code 506 can be for executing an operating system, an application system or subsystem, or both. When executed by the processing device 502, the instructions cause the processing device 502 to perform operations of the program code 506. When being executed by the processing device 502, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 504 store the program data 508 that includes one or more datasets described herein. In some embodiments, one or more of data sets are stored in the same memory component (e.g., one of the memory components 504). In additional or alternative embodiments, one or more of the programs, data sets, models, and functions described herein are stored in different memory components 504 accessible via a data network. One or more buses 510 are also included in the computer system 500. The buses 510 communicatively couple one or more components of a respective one of the computer system 500.

In some embodiments, the computer system 500 also includes a network interface device 512. The network interface device 512 includes any device or group of devices suitable for establishing a wired or wireless data connection to one or more data networks. Non-limiting examples of the network interface device 512 include an Ethernet network adapter, a modem, and/or the like. The computer system 500 is able to communicate with one or more other computing devices via a data network using the network interface device 512.

The computer system 500 may also include a number of external or internal devices, an input device 514, a presentation device 516, or other input or output devices. For example, the computer system 500 is shown with one or more input/output ("I/O") interfaces 518. An I/O interface 518 can receive input from input devices or provide output to output devices. An input device 514 can include any device or group of devices suitable for receiving visual, auditory, or other suitable input that controls or affects the operations of the processing device 502. Non-limiting examples of the input device 514 include a touchscreen, a mouse, a keyboard, a microphone, a separate mobile computing device, etc. A presentation device 516 can include any device or group of devices suitable for providing visual, auditory, or other suitable sensory output. Non-limiting examples of the presentation device 516 include a touchscreen, a monitor, a speaker, a separate mobile computing device, etc.

Although FIG. 5 depicts the input device 514 and the presentation device 516 as being local to the computer system 500, other implementations are possible. For instance, in some embodiments, one or more of the input device 514 and the presentation device 516 can include a remote client-computing device that communicates with computing system 500 via the network interface device 512 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 6:
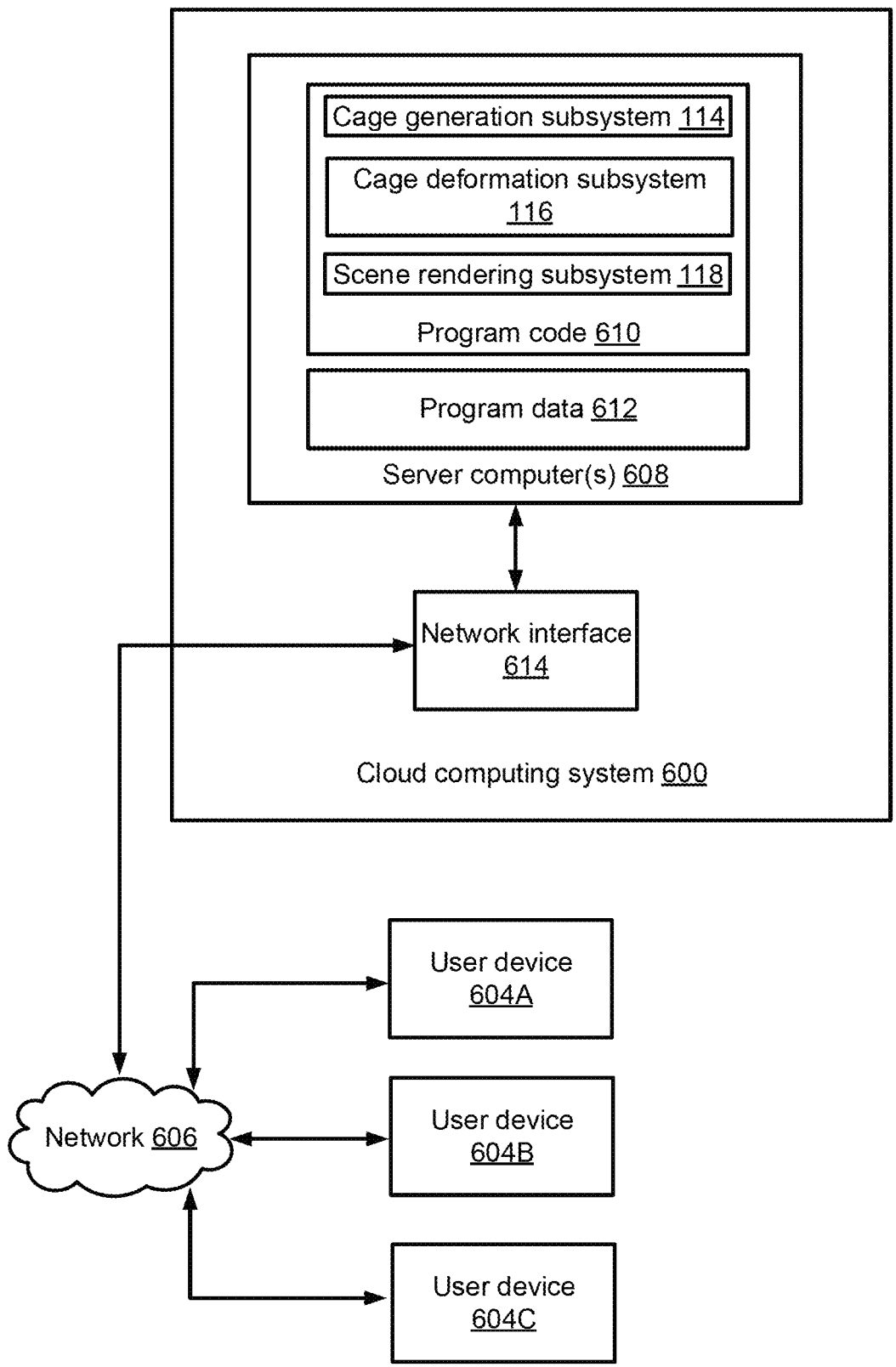
FIG. 6 an example of a cloud computing system that performs certain operations described herein, according to certain embodiments described in the present disclosure.

In some embodiments, the functionality provided by computer system 500 may be offered as cloud services by a cloud service provider. For example, FIG. 6 depicts an example of a cloud computer system 600 offering a service for generating cage coordinates for a cage model 102 and modifying a 3D object 101 by performing requested deformation operations on the cage model 102, that can be used by a number of user subscribers using user devices 604A, 604B, and 604C across a data network 606. In the example, the service for generating cage coordinates for a cage model 102 and modifying a 3D object 101 by performing requested deformation operations on the cage model 102 the service for generating cage coordinates for a cage model 102 and modifying a 3D object 101 by performing requested deformation operations on the cage model 102 described herein and modifying a 3D object 101 by performing requested deformation operations on the cage model 102, and the cloud computer system 600 performs the processing to provide the service for generating cage coordinates for a cage model 102 and modifying a 3D object 101 by performing requested deformation operations on the cage model 102. The cloud computer system 600 may include one or more remote server computers 608.

The remote server computers 608 include any suitable non-transitory computer-readable medium for storing program code 610 (e.g., the cage coordinates generation subsystem 114, and cage deformation subsystem 116, and the scene rendering subsystem 118 of FIG. 1) and program data 612, or both, which is used by the cloud computer system 600 for providing the cloud services. A computer-readable medium can include any electronic, optical, magnetic, or other storage device capable of providing a processing device with executable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 608 can include volatile memory, non-volatile memory, or a combination thereof.

One or more of the server computers 608 execute the program code 610 that configures one or more processing devices of the server computers 608 to perform one or more of the operations that generate a cage model 102 for a 3D object 101 using improved cage coordinates 103 described herein and modify a 3D object 101 by performing requested deformation operations on the cage model 102. As depicted in the embodiment in FIG. 10, the one or more servers providing the service for generating cage coordinates for a cage model 102 and modifying a 3D object 101 by performing requested deformation operations on the cage model 102 may implement the cage coordinates generation subsystem 114, the cage deformation subsystem 116, and the scene rendering subsystem 118. Any other suitable systems or subsystems that perform one or more operations described herein (e.g., one or more development systems for configuring an interactive user interface) can also be implemented by the cloud computer system 600.

In certain embodiments, the cloud computer system 600 may implement the services by executing program code and/or using program data 612, which may be resident in a memory component of the server computers 608 or any suitable computer-readable medium and may be executed by the processing devices of the server computers 608 or any other suitable processing device.

In some embodiments, the program data 612 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 606.

The cloud computer system 600 also includes a network interface device 614 that enable communications to and from cloud computer system 600. In certain embodiments, the network interface device 614 includes any device or group of devices suitable for establishing a wired or wireless data connection to the data networks 606. Non-limiting examples of the network interface device 614 include an Ethernet network adapter, a modem, and/or the like. The service for generating cage coordinates for a cage model 102 and modifying a 3D object 101 by performing requested deformation operations on the cage model 102 is able to communicate with the user devices 604A, 604B, and 604C via the data network 606 using the network interface device 614.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method performed by one or more computing devices associated with a scene modeling system, comprising:
    displaying, via a user interface, a three-dimensional (3D) space comprising a 3D object including a plurality of points and a cage model of the 3D object including a first positional configuration of vertices, the cage model comprising quad faces, each of the plurality of points located at a respective initial location;
    generating cage coordinates for the vertices of the 3D object, including:
        a vertex coordinate for each vertex of the cage model; and
        for each quad face of the cage model, four quad coordinates corresponding to each corner vertex of the quad face;
    deforming, responsive to receiving a request via the user interface, the cage model to change the first positional configuration of vertices to a second positional configuration of vertices, the second positional configuration being different from the first positional configuration;
    tessellating each quad face of the cage model into a set of triangles;
    producing constraints of computation variables based on a respective contribution of each triangle of the set of triangles to a harmonic function of the cage coordinates;
    applying a location function to each of the plurality of points, the location function being subject to the constraints of computation variables to ensure validity of coordinates for subsequent locations of each of the plurality of points; and
    generating, using the location function and based on the cage coordinates, the first positional configuration of vertices, and the second positional configuration of vertices, an updated 3D object by determining a subsequent location for each of the plurality of points of the 3D object.

2. The method of claim 1, wherein the vertex coordinates and the four quad coordinates are generated for each quad based at least in part on an input position of a point as well as the cage model.

3. The method of claim 1, wherein the location function is based on the cage coordinates, the first positional configuration of vertices of the cage model, and the second positional configuration of vertices of the deformed cage model.

4. The method of claim 1, wherein cage model further comprises one or more triangle faces, wherein the cage coordinates further comprise, for each triangle face of the cage model, a triangle coordinate.

5. The method of claim 4, wherein the triangle coordinates are determined based on input cage triangles with constant on-triangle-normal.

6. The method of claim 1, wherein the second positional configuration further comprises per-cage-quad-corner stretch values as well as per-cage-triangle stretch values determined based on the first positional configuration of vertices of the cage model and the second positional configuration of vertices of the cage model, wherein the stretch values are specific to the performed deformation of the cage model but common for all the vertices of the 3D object.

7. The method of claim 1, wherein generating the cage coordinates comprises:
    applying a per-quad Neumann condition that is based on a ratio of a deformed area of the cage model to a rest pose area of the cage model.

8. A system comprising:
    a memory component; and
    a processing device coupled to the memory component, the processing device to perform operations comprising:
        displaying, via a user interface, a three-dimensional (3D) space comprising a 3D object including a plurality of points and a cage model of the 3D object including a first positional configuration of vertices, the cage model comprising quad faces, each of the plurality of points located at a respective initial location;
        generating cage coordinates for the cage model including:
            a vertex coordinate for each vertex of the cage model; and
            for each quad face of the cage model, four quad coordinates
            corresponding to each corner vertex of the quad face;
        deforming, responsive to receiving a request via the user interface, the cage model to change the first positional configuration of cage vertices to a second positional configuration of cage vertices, the second positional configuration being different from the first positional configuration;
        tessellating each quad face of the cage model into a set of triangles;

producing constraints of computation variables based on a respective contribution of each triangle of the set of triangles to a harmonic function of the cage coordinates;

applying a location function to each of the plurality of points, the location function being subject to the constraints of computation variables to ensure validity of coordinates for subsequent locations of each of the plurality of points; and generating, using the location function and based on the cage coordinates of the 3D object, the first positional configuration of cage vertices, and the second positional configuration of cage vertices, an updated 3D object by determining a subsequent location for each of the plurality of points of the 3D object.

9. The system of claim 8, wherein the vertex coordinates and the four quad coordinates are generated for each quad based at least in part on an input position of a point as well as the cage model.

10. The system of claim 8, wherein the location function is based on the cage coordinates, the first positional configuration of vertices of the cage model, and the second positional configuration of vertices of the deformed cage model.

11. The system of claim 8, wherein cage model further comprises one or more triangle faces, wherein the cage coordinates further comprise, for each triangle face of the cage model, a triangle coordinate.

12. The system of claim 11, wherein the triangle coordinates are determined based on input cage triangles with constant on-triangle-normal.

13. The system of claim 8, wherein the second positional configuration further comprises per-cage-quad-corner stretch values as well as per-cage-triangle stretch values determined based on the first positional configuration of vertices of the cage model and the second positional configuration of vertices of the cage model, wherein the stretch values are specific to the performed deformation of the cage model but common for all the vertices of the 3D object.

14. The system of claim 8, wherein generating the cage coordinates comprises:
applying a per-quad Neumann condition that is based on a ratio of a deformed area of the cage model to a rest pose area of the cage model.

15. A non-transitory computer-readable medium storing executable instructions, which when executed by a processing device, cause the processing device to perform operations comprising:
displaying, via a user interface, a three-dimensional (3D) space comprising a 3D object including a plurality of points and a cage model of the 3D object including a first positional configuration of vertices, the cage model comprising quad faces, each of the plurality of points located at a respective initial location;
generating cage coordinates for the cage model including:
a vertex coordinate for each vertex of the cage model; and
for each quad face of the cage model, four quad coordinates corresponding to each corner vertex of the quad face;
deforming, responsive to receiving a request via the user interface, the cage model to change the first positional configuration of vertices to a second positional configuration of vertices, the first positional configuration being different from the first positional configuration;
tessellating each quad face of the cage model into a set of triangles;
producing constraints of computation variables based on a respective contribution of each triangle of the set of triangles to a harmonic function of the cage coordinates;
applying a location function to each of the plurality of points, the location function being subject to the constraints of computation variables to ensure validity of coordinates for subsequent locations of each of the plurality of points; and
generating, using the location function and based on the cage coordinates, the first positional configuration of vertices, and the second positional configuration of vertices, an updated 3D object by determining a subsequent location for each of the plurality of points of the 3D object.

16. The non-transitory computer-readable medium of claim 15, wherein the four quad coordinates are generated for each quad based at least in part on corner vertex normals defining the respective quad face.

17. The non-transitory computer-readable medium of claim 15, wherein the location function is based on the cage coordinates, the first positional configuration of vertices of the cage model, and the second positional configuration of vertices of the deformed cage model.

18. The non-transitory computer-readable medium of claim 15, wherein cage model further comprises one or more triangle faces, wherein the cage coordinates further comprise, for each triangle face of the cage model, a triangle coordinate.

19. The non-transitory computer-readable medium of claim 18, wherein the triangle coordinate is determined based on a nonvarying normal for the triangle.

20. The non-transitory computer-readable medium of claim 15, wherein the cage coordinates further comprise a stretch coordinate determined based on the first positional configuration of vertices of the cage model and the second positional configuration of vertices of the cage model, wherein the stretch coordinate is specific to the performed deformation.

21. The non-transitory computer-readable medium of claim 15, wherein generating the cage coordinates comprises:
applying a Neumann condition that is based on a ratio of a deformed area of the cage model to a rest pose area of the cage model.

\* \* \* \* \*